United States Patent [19]
Eber

[11] 3,808,834
[45] May 7, 1974

[54] ABSORPTION REFRIGERATION APPARATUS

[75] Inventor: Nicolas Eber, Zurich, Switzerland

[73] Assignee: Aktiengesellschaft Electrolux, Stockholm, Sweden

[22] Filed: June 2, 1971

[21] Appl. No.: 149,209

[52] U.S. Cl. .................................. 62/490, 62/497
[51] Int. Cl. ............................................ F25b 15/10
[58] Field of Search ............. 62/110, 490, 495, 496, 62/497

[56] References Cited
UNITED STATES PATENTS

| | | | |
|---|---|---|---|
| 2,161,875 | 6/1939 | Lenning | 62/497 X |
| 2,339,815 | 1/1944 | Roth | 62/497 X |
| 2,736,175 | 2/1956 | Ostergren et al. | 62/497 X |
| 2,999,373 | 9/1961 | Stierlin | 62/497 |

FOREIGN PATENTS OR APPLICATIONS

| | | | |
|---|---|---|---|
| 911,136 | 4/1954 | Germany | 62/497 |
| 739,458 | 10/1955 | Great Britain | 62/495 |

Primary Examiner—William F. O'Dea
Assistant Examiner—Peter D. Ferguson
Attorney, Agent, or Firm—Edmund A. Fenander

[57] ABSTRACT

A single vertically disposed conduit of abosrption refrigeration apparatus has a lower part serving as a generator or heat receiving section and an upper part serving as a rectifier. The single conduit defines an upright space for holding a body of absorption solution. Adsorption solution flows to an upper region of the upright space and is withdrawn from a lower region thereof, the solution flowing downward in the space in counterflow to upwardly flowing vapor expelled from solution by heating in the heat receiving section.

The single conduit is constructed and formed to provide a series of vertically spaced sharply reduced zones only in the upper part thereof which serves as the rectifier. The sharply reduced zones define constrictions through which upwardly flowing vapor can only pass in the form of small vapor bubbles and also offer material resistance to downward flow of absorption solution in the vertical space to build up and maintain a liquid column above each constriction. The sharply reduced zones are vertically spaced from one another to separate from the upwardly flowing vapor bubbles the relatively small quantity of liquid tending to be carried upward with the vapor.

1 Claim, 2 Drawing Figures

PATENTED MAY 7 1974 3,808,834
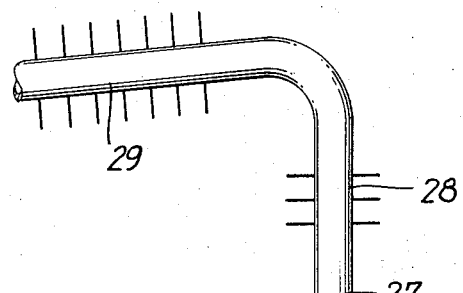
FIG. 1
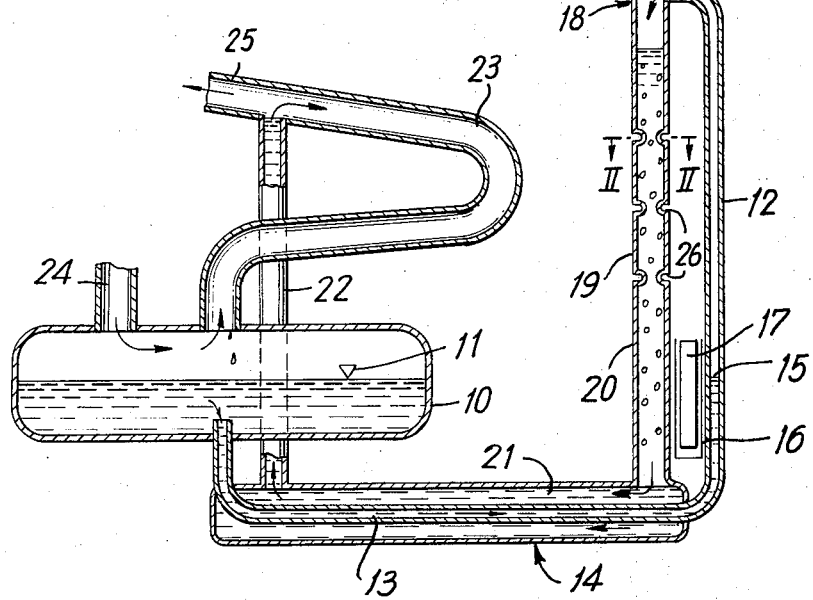
FIG. 2
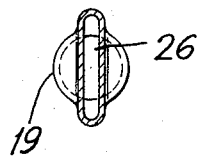

ABSORPTION REFRIGERATION APPARATUS

This invention relates to an arrangement in an absorption refrigerating apparatus having a boiler system with rectifier.

Several boiler constructions for absorption refrigerating apparatus are known in which a rectifier is used to improve the efficiency of the boiler. Through these rectifiers flow on the one hand absorption solution which is relatively rich in refrigerant and has a comparatively low temperature, and on the other hand a mixture of refrigerant vapour and vapour of absorption medium which has a comparatively high temperature. As the counterflow rectification proceeds, the vapour mixture becomes richer in refrigerant and colder whereby the heat losses to the ambient in a subsequent water separator or vapour cooler are reduced and the total efficiency of the apparatus increased. To obtain efficient rectification it is above all necessary to have a large surface of exchange between vapour phase and liquid phase and to secure a real counter-flow between liquid and vapour through the entire flow section passed in the rectifier. It is furthermore important, that the flow resistance in the rectifier is not too great, since in such case the total height of the boiler has to be increased to balance the risk of operation instability.

One has tried to master the mentioned difficulties by applying some kind of rectifying insert, such as wire netting, screen plates, balls or other filling bodies, in the riser of the boiler at such place where rectification is desired. However, all these rectifiers have some drawbacks in common. Firstly, they are expensive in production because they require certain manual operations, particularly during assembly. Secondly, the metal surface coming into contact with the working media in the boiler is increased and hence also the consumption of corrosion preventing agents in the solution which may lead to a shortened life of the refrigerating system.

The present invention has for its purpose to provide an arrangement in a boiler with rectifier which can be manufactured fully automatically without any inserts and without manual operations and which will thereby be cheap in manufacture and at the same time be such that the metal surface in the boiler is not enlarged. The invention is for that purpose mainly characterized in that the wall of the pipe has been deformed to provide several narrow, preferably straight constrictions spaced one above the other, through which vapours of the working media are passing in counterflow to a solution of refrigerant and absorption medium.

The invention will be described in detail in the following with reference to an absorption refrigerating apparatus chosen by way of example and shown diagrammatically in the accompanying drawing. FIG. 1 shows the liquid circulation system in an absorption refrigerating apparatus operating with inert gas. FIG. 2 is a horizontal section on the line II—II in the rectifier of FIG. 1.

FIG. 1 shows diagrammatically the liquid circulation system in an absorption refrigerating apparatus operating with inert gas and using water, ammonia and hydrogen as working media. However, it is also possible to use other working media. Since the function and the operation of known absorption refrigerating apparatus is known, the design of other details of the apparatus can in this connection be disregarded. The absorber vessel 10 of the refrigerating apparatus shown in the drawing contains rich absorption solution up to a liquid level 11. During break of operation, a liquid level 15 in a pump pipe 12, which by an inner pipe 13 in the liquid heat exchanger 14 of the apparatus communicates with the absorber vessel 10, extends to approximately the height shown in FIG. 1. The rich solution from the absorber vessel 10 flows through the inner pipe 13 of a liquid heat exchanger 14 to the pump pipe 12 which is made such that it forms a thermosiphon pump to which heat is supplied by a sleeve 16 for an electric heating cartridge 17. Absorption solution raised in the pump pipe 12 flows into a standpipe 18 which by a rectifier 19 forms an extension of the boiler 20 of the apparatus, the boiler like the pump pipe being heat-conductively connected with the sleeve 16, for instance through several welds or one weld joint. The weak solution flows downwardly through the boiler 20 and further on through an outer conduit 21 in the liquid heat exchanger 14 whence it is conducted through a riser 22 into the upper part of the absorber 23 of the apparatus.

Rich gas from the evaporator system, not shown, of the apparatus is led into the absorber vessel 10 through a conduit 24 and then flows through part of the vessel and through the absorber 23. The weak gas formed after absorption of refrigerant from the weak solution flowing downwardly through the absorber flows through a conduit 25 further through a gas heat exchanger, not shown, back to the evaporator system of the apparatus. The absorption solution which has been enriched in refrigerant in the absorber, is collected in the absorber vessel 10.

The rectifier 19 shown in FIGS. 1 and 2 comprises a conduit pipe having several narrow, straight constrictions 26 spaced one above the other. Thus, the absorption solution coming from the pump pipe 12 and partly freed of refrigerant flows downwardly through these constrictions and meets the mixture of refrigerant vapour and vapour of absorption medium coming from the boiler 20. In the boiler 20, the vapour has a higher temperature than the solution supplied from the pump 12 into the standpipe 18. The constrictions 26 in the rectifier 19 have such width that the vapour can rise only in the shape of small vapour bubbles which, therefore, present a large surface. Thus, an intense exchange of substance and an intense exchange of heat are obtained between the vapour and the liquid phase in the rectifier.

The narrow constrictions 26 in the rectifier 19 also prevent liquid and vapour from passing each other without mutual contact and thus they guarantee maintaining of a real counterflow process. Evidently, the narrow constrictions offer some flow resistance and hence a given liquid column will be built up above each constriction. Further, it must be possible between the different constrictions to separate from the vapour the small quantity of liquid carried away by it. To satisfy these conditions, the distance between the different constrictions 26 should be at least 10 mm.

The physical properties, especially viscosity and surface tension, of the working media chosen for a given apparatus and further the mass flow of vapour and liquid as well as the length of the constrictions 26 are decisive for the width of the constrictions. Experiments with ammonia and water within the ranges of effect usual in absorption refrigerating apparatus have shown that the best width of the constrictions is about 1 mm, while favourable results have been obtainable with constrictions of up to 2.0 mm.

In the apparatus shown in FIG. 1, the narrow rectifier constrictions 26 have been obtained by indentation by means of suitable tools in the walls of the rectifier pipe 19, as shown in FIG. 2. The smallest number of rectifying constrictions 26 that are theoretically required corresponds to the required number of discs in rectifier columns, which number can be established in known manner. As seen in FIGS. 1 and 2 the pipe 18 is deformed and non-circular in cross-section to provide a series of vertically spaced sharply reduced zones only in the upper part thereof which serves as the rectifier 19. The sharply reduced zones define the constrictions 26 which are in the form of elongated narrow slits having substantially parallel sides and connecting ends. It will be observed in FIG. 2 that the constrictions 26 are longer than the diameter of the pipe 18 at regions thereof between the zones the pipe is deformed and extend across the pipe between diametrically opposed regions thereof. As explained above, the constrictions 26 are of such length and so shaped and formed at the zones the pipe 18 is deformed that upwardly flowing vapor can only pass through the slits in the form of relatively small vapor bubbles with the slits also offering material resistance to downward flow of absorption solution in the pipe 18 which is sufficient to build up and maintain a liquid column above each constriction 26.

The vapour expelled through the thermosiphon pump 12 together with the vapour leaving the rectifier, flows through a vapour conduit 27 having a water separator 28, further on to a condenser 29 in which the refrigerant vapour is condensed and then conducted to the evaporator, not shown, of the apparatus.

In view of the foregoing, it now will be understood that the single vertically disposed conduit or standpipe 18 defines an upright space which, between upper and lower regions of the conduit, holds a body of absorption solution. The horizontal cross-sectional area of the space, at successive zones from the upper to the lower regions thereof, is defined only by the diametrically opposing sides of the single conduit 18.

The single conduit 18 has a lower part 20 serving as a generator or heat receiving section and an upper part 19 serving as a rectifier. The sleeve 16, within which the heating element 17 is disposed, is heat conductively connected only to the exterior surface of the generator or heat receiving section 20 of the conduit 18.

The series of vertically spaced sharply reduced zones 26 are only formed in the upper part 19 of the conduit 18 which serves as the rectifier. The spaced zones 26 define constrictions through which upwardly flowing vapor can only pass in the form of relatively small vapor bubbles and also offer material resistance to downward flow of absorption solution in the vertical space which is sufficient to build up and maintain a liquid column above each constriction 26. Also, the sharply reduced zones 26 are vertically spaced from one another to separate from the upwardly flowing vapor bubbles the relatively small quantity of liquid tending to be carried upward with the vapor.

I claim:
1. In absorption refrigeration apparatus,
   a. a single vertically disposed pipe of cylindrical form defining an upright space which, between upper and lower regions thereof, holds a body of absorption solution having refrigerant in solution therein,
   b. said pipe including a lower part serving as a generator having a heat receiving section and an upper part serving as a rectifier,
   c. heating means directly heating only the exterior surface of the heat receiving section of the lower part of said pipe,
   d. said heating means constituting a source of heat external to the apparatus to expel vapor from solution at an elevated temperature in said heat receiving section,
   e. means for flowing absorption solution enriched in refrigerant to the upper region of said pipe and for withdrawing solution weak in refrigerant from the lower region thereof, the absorption solution introduced to the upper region of said pipe flowing downward through said space in counterflow to upwardly flowing vapor,
   f. said pipe being deformed and non-circular in cross-section to provide a series of vertically spaced sharply reduced zones only in the upper part thereof which serves as said rectifier,
   g. said sharply reduced zones defining constrictions in the form of elongated narrow slits having spaced substantially parallel sides and connecting ends, said constrictions being longer than the diameter of said pipe at regions thereof between the zones said pipe is deformed and extending across said pipe between diametrically opposed regions thereof,
   h. said constrictions being of such length and so shaped and formed at the zones said pipe is deformed that upwardly flowing vapor can only pass through said slits in the form of relatively small vapor bubbles with said slits also offering material resistance to downward flow of absorption solution in said vertical space which is sufficient to build up and maintain a liquid colum above each constriction, and
   said sharply reduced zones being vertically spaced from one another to promote separating from the upwardly flowing vapor bubbles the relatively small quantity of liquid tending to be carried upward with the vapor.

* * * * *

UNITED STATES PATENT OFFICE
CERTIFICATE OF CORRECTION

Patent No. 3,808,834  Dated June 24, 1974

Inventor(s) NICHOLAS EBER

It is certified that error appears in the above-identified patent and that said Letters Patent are hereby corrected as shown below:

Title Page, left-hand column, line 2, change "Aktiengesellschaft Electrolux" to

--Aktiebolaget Electrolux

Title page, right-hand column, line 6, change "Adsorption" to --Absorption--.

Signed and sealed this 5th day of November 1974.

(SEAL)
Attest:

McCOY M. GIBSON JR.
Attesting Officer

C. MARSHALL DANN
Commissioner of Patents